US007682722B2

(12) United States Patent
Melzner et al.

(10) Patent No.: US 7,682,722 B2
(45) Date of Patent: Mar. 23, 2010

(54) MEMBRANE-ELECTRODE ASSEMBLY, POLYMER MEMBRANES FOR A MEMBRANE-ELECTRODE ASSEMBLY, POLYMER ELECTROLYTE FUEL CELLS, AND METHODS FOR THE PRODUCTION THEREOF

(75) Inventors: Dieter Melzner, Goettingen (DE); Annette Reiche, Goettingen (DE); Ulrich Maehr, Berlin (DE); Suzana Kiel, Goettingen (DE)

(73) Assignee: elcomax membranes GmbH, Munich (DE)

( * ) Notice: Subject to any disclaimer, the term of this patent is extended or adjusted under 35 U.S.C. 154(b) by 1250 days.

(21) Appl. No.: 11/183,873

(22) Filed: Jul. 19, 2005

(65) Prior Publication Data

US 2007/0087244 A1    Apr. 19, 2007

Related U.S. Application Data

(63) Continuation of application No. PCT/EP03/14623, filed on Dec. 19, 2003.

(30) Foreign Application Priority Data

Jan. 20, 2003    (DE) ................ 103 01 810

(51) Int. Cl.
*H01M 8/10* (2006.01)
*B31B 1/60* (2006.01)
*C08J 5/00* (2006.01)

(52) U.S. Cl. .............. 429/30; 429/33; 156/60; 264/331.11

(58) Field of Classification Search ......... 429/30, 429/33; 156/60; 264/331.11

See application file for complete search history.

(56) References Cited

U.S. PATENT DOCUMENTS

| | | | | | |
|---|---|---|---|---|---|
| 4,141,800 | A | * | 2/1979 | Breuer et al. | 205/779.5 |
| 5,322,916 | A | * | 6/1994 | O'Brien et al. | 528/183 |
| 5,525,436 | A | * | 6/1996 | Savinell et al. | 429/30 |
| 5,599,639 | A | * | 2/1997 | Sansone et al. | 429/33 |
| 6,060,190 | A | * | 5/2000 | Campbell et al. | 429/40 |

(Continued)

FOREIGN PATENT DOCUMENTS

DE    101 17 686 A1    10/2002

(Continued)

OTHER PUBLICATIONS

M.S. Wilson, et al, "Thin-Film Catalyst Layers for Polymer Electrolyte Fuel Cell Electrodes", Feb. 7, 1991, Electronics Research Group, Los Alamos National Laboratory, Los Alamos, New Mexico, USA.

(Continued)

*Primary Examiner*—Peter D. Mulcahy
*Assistant Examiner*—Henry Hu
(74) *Attorney, Agent, or Firm*—Sughrue Mion, PLLC

(57) ABSTRACT

A membrane-electrode assembly and polymer electrolyte fuel cells and methods of production thereof, in which a polymer membrane, containing at least one basic polymer membrane, is sandwiched between two flat gas diffusion electrodes each of which is loaded with a dopant, whereby after reaching a mass transport equilibrium for the exchange of the dopant between the gas diffusion electrodes and the polymer membrane, the polymer membrane has a conductivity of at least 0.1 S/m at a temperature of no less than 25° C.

19 Claims, 1 Drawing Sheet

U.S. PATENT DOCUMENTS

| | | | |
|---|---|---|---|
| 6,197,147 | B1 | 3/2001 | Boensel et al. |
| 6,869,980 | B2 * | 3/2005 | Cui .............................. 521/27 |
| 7,098,163 | B2 * | 8/2006 | Hampden-Smith et al. .. 502/101 |
| 7,235,320 | B2 * | 6/2007 | Calundann et al. ............ 429/30 |

FOREIGN PATENT DOCUMENTS

| | | |
|---|---|---|
| EP | 0 827 228 A1 | 3/1998 |
| EP | 0 967 674 A1 | 12/1999 |
| EP | 1 205 994 A2 | 5/2002 |
| EP | 1 593 172 B1 | 7/2007 |
| WO | WO 96/13872 A1 | 5/1996 |
| WO | WO 96/13874 A1 | 5/1996 |
| WO | 97 23919 A1 | 7/1997 |
| WO | WO 00/30202 A1 | 5/2000 |
| WO | WO 00/44186 A1 | 7/2000 |
| WO | WO 00/44816 A1 | 8/2000 |
| WO | WO 00/56431 A1 | 9/2000 |
| WO | WO 01/18894 A2 | 3/2001 |
| WO | WO 01/64322 A1 | 9/2001 |
| WO | WO 02/081547 A1 | 10/2002 |

OTHER PUBLICATIONS

O. Savadogo, "Emerging Membranes for Electrochemical Systems: (I) Solid Polymer Electrolyte Membranes for Fuel Cell Systems", Oct. 22, 1997, Revised Mar. 10, 1998, Journal of New Materials for Electrochemical Systems 1, 47-66 (1998) Canada.

Jiangtao Wang: "High Temperature Proton Conducting Polymer Fuel Cells" Department of Chemical Bioengineering, Case Western Reserve University, pp. 58-80, May 1996.

Li Qingofeng et al.: "Phosphoric Acid Doped Polybenzimidazole Membranes: Physicochemical Characterization and Fuel Cell Applications" Journal of Applied Electrochemistry 31: pp. 773-779, 2001.

J.T. Wang et al.: "A H2/O2 Fuel Cell Using Acid Doped Polybenzimidazole as Polymer Electrolyte" Electrochimica Acta, vol. 41, No. 2, pp. 193-197, 1996.

* cited by examiner

MEMBRANE-ELECTRODE ASSEMBLY, POLYMER MEMBRANES FOR A MEMBRANE-ELECTRODE ASSEMBLY, POLYMER ELECTROLYTE FUEL CELLS, AND METHODS FOR THE PRODUCTION THEREOF

This is a Continuation of International Application PCT/EP2003/014623, with an international filing date of Dec. 19, 2003, which was published under PCT Article 21(2) in German, and the disclosure of which is incorporated into this application by reference.

FIELD AND BACKGROUND OF THE INVENTION

The invention relates to a membrane-electrode assembly, a polymer membrane for a membrane-electrode assembly and a polymer electrolyte fuel cell in the working temperature range up to 250° C. as well as methods for production of same.

For stationary and mobile generation of electricity, e.g., for road vehicles, in space travel, in power plants, etc., fuel cells are being investigated and developed to an increasing extent as a possible source of electric power. A fuel cell is a galvanic element in which chemical energy is converted to electricity directly, i.e., not by way of thermal energy. The individual cell consists of two invariant electrodes between which there is an invariant electrolyte. The fuel cell supplies electric current continuously; the substance that is to be oxidized, i.e., the so-called fuel, such as hydrogen, which is obtained by cleavage of natural gas, methanol, hydrazine, ammonia, etc., and the oxidizing agent, e.g., oxygen, are supplied continuously, and the oxidation products such as water are removed continuously.

At the start of the use of polymer membranes as the invariant solid electrolyte, attention was devoted to proton conducting polymer membranes based on ionomers containing perfluorinated sulfonic acid units, e.g., perfluoroalkyl sulfonic acid polymer electrolytes. Such a polymer membrane is available by the brand name Nafion® from DuPont, for example. Such polymer membranes are heterogeneous systems. The hydrophilic and hydrophobic polymer building blocks form a cluster structure into which water is incorporated as the prerequisite for a high conductivity. In these heterogeneous systems, the charge transport is bound to the liquid phase, i.e., the aqueous phase. The fact that water molecules in these proton conductors function as proton carriers means that the water concentration in the cell must be kept constant. The latter condition is problematic because water is always created as an oxidation product in the reaction and therefore must be removed in a controlled manner. Likewise, the fuel cells operate at temperatures below 100° C. due to the role of the water molecule as a proton carrier, because water is expelled from the polymer membranes at temperatures above 100° C. This would lead to a reduction in conductivity, which is why the polymer membranes are limited to use in a temperature range below 100° C. (O. Savadogo et al., *Journal of New Materials for Electrochemical Systems*, vol. 1 (1988), pp. 47-66). Another problem with polymer membrane fuel cells based on Nafion is that the catalysts used are particularly sensitive to catalyst toxins such as carbon monoxide in the temperature range below 100° C. and operate less effectively in general.

U.S. Pat. No. 5,525,436 describes a solid polymer electrolyte membrane which includes a proton conducting polymer that has thermal stability up to temperatures of 400° C. The proton conducting polymer may be a basic polymer, preferably polybenzimidazole (PBI) which is doped with a strong acid, preferably sulfuric acid or phosphoric acid. When doped with a strong acid such as sulfuric acid or phosphoric acid, a basic polymer such as PBI leads to a polymer electrolyte which forms a single-phase system in which the acid is complexed by the polymer. In contrast with the heterogeneous water-based systems described previously, charge transport does not presuppose the presence of an aqueous phase.

For example, in the single-phase electrolyte system described in U.S. Pat. No. 5,525,436 (also in contrast with heterogeneous systems), industrially relevant conductivities are reached only at temperatures above 100° C. The conductivity of the polymer membrane depends on the concentration of phosphoric acid contained in it but does not depend to any mentionable extent on the water content. Polymer membranes based on PBI are gastight. For this reason and due to the complexing of the acid by the polymer, the loss of acid from the cell is negligible. The use of corresponding polymer membranes should permit operation of the fuel cell in the working temperature range of >100° C.<200° C., with advantages in the range of catalyst efficiency and low catalyst sensitivity and should greatly simplify water management. For these reasons and because of the high oxidation stability of this polymer, phosphoric acid-doped PBI polymer membranes have been developed as the electrolyte and separator for fuel cells in the working temperature range above 100° C., e.g., for approximately 160° C.

The phosphoric acid-doped PBI polymer membranes are usually manufactured in a multi-step process (see WO 01/18894 A2 or WO 96/13874 A1), with the PBI being dissolved in dimethyl acetamide (DMAc) containing 2% lithium chloride (LiCl) in the first step and the solution being applied in the form of a film by casting or spraying. After drying the film, the LiCl is extracted from the film with water. An amorphous and flexible polymer membrane is obtained as an intermediate product. In the next process step, this polymer membrane is doped with sulfuric acid ($H_2SO_4$) or preferably with phosphoric acid ($H_3PO_4$). In the process, the polymer membrane absorbs many times its own weight of dopant. The resulting doped polymer membrane is partially crystalline, mechanically unstable because of the high degree of swelling and also difficult to handle. The degree of crystallinity and thus the mechanical instability increase in the presence of water, e.g., in storage or due to the water generated in operation of the fuel cell.

Another way to produce phosphoric acid-doped PBI polymer membranes consists of preparing solutions of suitable monomers and/or prepolymers in polyphosphoric acid, as described in WO 02/081547 A1 or DE 10117686 A1, then to convert these solutions to membrane form through suitable methods and polymerize them by the action of temperatures up to 300° C. and finally to hydrolyze them under the influence of atmospheric humidity.

In principle, the polymer membranes used in the past for production of fuel cells have had a high dopant content. When phosphoric acid was used, the ratio of acid to monomer unit of which the polymer is composed was usually more than 50 wt % $H_3PO_4$ (approximately 400 mol %) (U.S. Pat. No. 5,525,436, column 10: 470 mol % corresponding to 55 wt %); WO 01/18894, column 6: approximately 67 wt %). Even higher phosphoric acid contents, up to 85 wt %, can be achieved by film-forming polymerization in polyphosphoric acid (WO 02/081547 A1 or DE 10117686 A1). This leads to highly swollen polymer membranes which undergo deformation and have a mechanical loading capacity that leaves much to be desired, which makes their use in a fuel cell problematic, in particular from the standpoint of cell design and long-term stability.

To improve the mechanical properties, it was proposed in WO 00/44816 A1 that the polymer membrane of PBI should be crosslinked with the help of a crosslinking agent. This makes it possible to limit the decline in mechanical stability associated with doping and to improve the processability of the polymer membrane. However, the mechanical strength is still inadequate for practical use in fuel cells because even with these polymer membranes, a ratio of $H_3PO_4$ to the PBI repeating unit of more than 6 (corresponding to approximately 65 wt % $H_3PO_4$) was also selected with these polymer membranes (WO 00/44816 A1, Table 2, page 16) to ensure an adequate conductivity of the polymer membrane. All the test results on membrane-electrode assemblies described in the literature are therefore based on the investigation of small cells in which the low mechanical stability of the polymer membrane is not so important and which have an active area of less than 40 $cm^2$ (WO 00/30202 A1, WO 01/18894 A2 and investigations in micro-fuel cells: WO 96/13872 A1).

Membrane-electrode assemblies for polymer electrolyte fuel cells for a working temperature range between 100 and 200° C. with polymer electrolyte polymer membranes based on the PBI-$H_3PO_4$ system usually contain two gas diffusion electrodes separated by the polymer membrane.

The gas diffusion electrodes described in the literature for this application have a structure similar to that of electrodes for MEAs with electrolyte membranes based on Nafion, but Nafion is eliminated as an electrode component. The proton conducting connection between the electrode and electrolyte is usually ensured by phosphoric acid. To do so, the electrodes are impregnated with phosphoric acid before assembly of the cell (WO 01/18894 A2). U.S. Pat. No. 5,599,639 is based on the fact that phosphoric acid diffuses out of the polymer membrane into the electrode.

At working temperatures of >>100° C., the loss of phosphoric acid from the cell is minimal. An additional restriction on the phosphoric acid discharge from the cell can be achieved, as proposed in WO 01/18894 A2, PBI is used as the polymer binder for the electrodes, although this is not without problems because of the property of PBI of forming dense films.

OBJECTS OF THE INVENTION

One object of the present invention is to make available a membrane-electrode assembly (MEA) for polymer electrolyte fuel cells, a polymer membrane for an MEA and a polymer electrolyte fuel cell which has a high power in the working temperature range above 50° C. with which the disadvantages cited above can be overcome. Another object is to propose methods for producing same that can be implemented easily.

SUMMARY OF THE INVENTION

The inventive membrane-electrode assembly comprises two flat gas diffusion electrodes with a flat polymer membrane sandwiched between them and having at least one basic polymer; it also consists of a dopant with which the gas diffusion electrodes are loaded to form a dopant reservoir for the polymer membrane. The polymer membrane is fixedly connected to the gas diffusion electrodes in a proton conducting manner via the dopant after the action of pressure and temperature and has a conductivity of at least 0.1 S/m at a temperature of no less than 25° C. in the doped state. The MEA is suitable for polymer electrolyte fuel cells with a working temperature up to 250° C.

The polymer membrane includes a basic polymer which is rendered proton conducting by doping with a dopant and in this state has a technically relevant conductivity. The basic polymer is selected from the group of polybenzimidazoles, polypyridines, polypyrimidines, polyimidazoles, polybenzthiazoles, polybenzoxazoles, polyoxadizoles, polyquinoxalines, polythiadiazoles, poly(tetraazapyrenes) or a copolymer or mixture of two or more representatives of this group. In a preferred embodiment of this invention, the basic polymer is polybenzimidazole (PBI).

These electrodes are porous gas diffusion electrodes with a layer containing the catalyst facing the polymer membrane, this layer being applied to a gas diffusion layer of a carbon matrix. The gas diffusion electrodes are loaded with dopant, so they form a dopant reservoir for the polymer membrane which need not be doped at the time of assembly of the MEA. In a preferred embodiment of the invention, the dopant content in the gas diffusion electrodes amounts to 60% to 120% of the weight of the basic polymer in the polymer membrane.

In another preferred embodiment of this invention, the dopant is a strong polybasic inorganic acid, with phosphoric acid being especially preferred.

The amount of phosphoric acid that can be absorbed by the polymer membrane depends on the temperature and the doping time. Whereas the process proceeds very slowly at low temperatures and leads to degrees of doping of up to 50 wt %, at temperatures above 100° C. large quantities of $H_3PO_4$ can be incorporated into the polymer membrane very rapidly. It has surprisingly been found that for temperatures at which the polymer electrolyte fuel cells are preferably to be operated, namely at temperatures between 100 and 200° C., the highly porous gas diffusion electrodes function as a reservoir for the dopant which releases dopant to the polymer membrane to an adequate extent under the operating conditions of the polymer electrolyte fuel cells. This has the advantage that for constructing the membrane-electrode assembly, even undoped polymer membranes that can withstand high mechanical loads may be used. Under operating conditions there is a redistribution of the dopant from the gas diffusion electrodes into the polymer membrane so that the gas diffusion electrodes are bound to the polymer membrane in a proton conducting manner and the polymer membrane reaches values of $\geq 0.1$ S/m (25° C.) for the conductivity.

It has been found the polymer membrane softens during doping in the MEA under operating conditions and thus good contact is established between the gas diffusion electrodes and the proton conducting polymer membrane. Subsequent crystallization processes in the polymer membrane in the presence of dopant mechanically stabilize the gas diffusion electrode-polymer membrane-gas diffusion electrode sandwich and ensure a tight physical cohesion. Complexing between the basic polymer and dopant, resulting in gas impermeability of an intact polymer membrane and capillary effects in the gas diffusion electrodes cause the dopant to remain in the inventive MEA under operating conditions (T>>100° C., p>1 bar) and not to be lost from the cell due to product water that is formed.

If the replacement of dopant in the polymer electrolyte fuel cell and the resulting swelling processes in the polymer membrane cause stresses at the electrode-electrolyte contact surface (proton conducting polymer membrane) which result in tearing of the polymer membrane, then in a preferred embodiment of this invention a plasticized polymer membrane, e.g., a polymer membrane containing phosphate esters, may be used to prevent this. Such softened polymer membranes may contain up to 40 wt % plasticizer. In this case the equilibration processes in the manufacture of the MEA and in starting operation of a polymer electrolyte fuel cell proceed much more rapidly. Furthermore, it is advantageous to crosslink the polymer membrane so that the mechanical stability of the polymer membrane is increased, and furthermore, the maximum degree of doping of the polymer membrane that can be achieved due to swelling is restricted to the amount needed to achieve conductivity, which in turn has a positive effect on the lifetime of the polymer electrolyte fuel cell. Another advantage of this invention is the optimization of dopant content, so that only as much as is necessary for the binding of the gas diffusion electrode and polymer membrane and for the conductivity of the polymer membrane is present, which also increases the lifetime of the polymer electrolyte fuel cell and improves the efficiency of the electrochemical processes taking place.

Another advantage of this invention is that in the case of using a nondoped polymer membrane or even in the case of using a polymer membrane containing a plasticizer based on an ester of a polybasic inorganic acid, the process for producing the polymer membranes is greatly shortened because the polymer membranes can be produced by continuous machine drawing in the use form without any additional reworking.

Suitable gas diffusion electrodes for the inventive membrane-electrode assembly have a gas diffusion layer and a catalyst layer. The porous gas diffusion electrodes are permeable for the reaction gases (e.g., hydrogen and air) and are electrically conductive due to a high carbon content. It is known that the gas diffusion electrodes are usually manufactured by producing a paste of a solution of polymer binder such as polytetrafluoroethylene or the basic polymer of the polymer membrane, plus platinum black and carbon black, e.g., Vulcan XC 72 from the company Heraeaus [sic; Heraeus] (FRG) and applying this paste to the gas diffusion layer of the gas diffusion electrode as described by Gottesfeld et al., *J. Appl. Electrochem.* 22 (1992) pages 1 through 7. The gas diffusion layer may be a nonwoven or a woven made of carbon fibers. The gas diffusion layer and the catalyst layer form the dopant reservoir for the entire MEA. Electrodes with a total thickness between 300 and 400 μm should be able to absorb between 0.2 and 0.5 g dopant per cm³ electrode volume.

The polymer membrane for the inventive MEA is produced by industrial machine drawing of a polymer solution, which may include one or more basic polymers. These are understood to be polymers which are capable of binding dopants as defined below on the basis of their basicity. Preferred basic polymers include polybenzimidazole, polypyridine, polypyrimidine, polyimidazoles, polybenzdiazoles, polybenzoxazoles, polyoxadiazoles, polyquinoxalines, polythiadiazolines and poly(tetraazapyrenes) or copolymers or mixtures of two or more of the aforementioned representatives. Basic polymers of the general formula given below are especially preferred according to this invention:

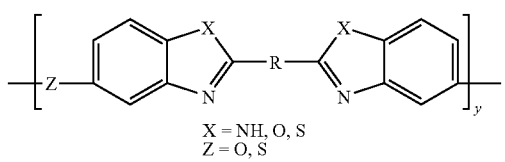

X = NH, O, S
Z = O, S

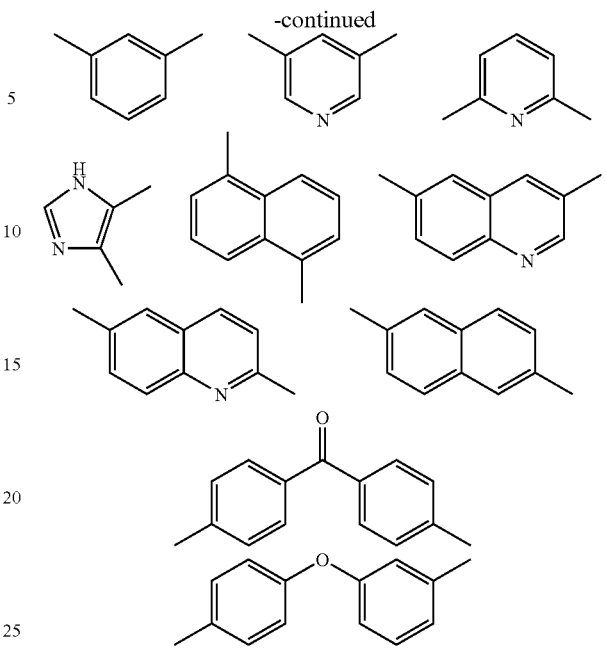

R preferably denotes one of the groups listed above or a divalent linkage group such as a linear or branched, substituted or unsubstituted, optionally perfluorinated $CF_2$—$CF_2$ hydrocarbon group.

X may denote an amino group or an oxygen atom or a sulfur atom, and Z may stand for an oxygen or sulfur atom.

In addition, the basic polymer may be sulfonated or phosphonated, as described in U.S. Pat. No. 5,599,639, but phosphonation is preferred. This may be appropriate to counteract the discharge of dopant from the MEA. The basic material in the form of one or more flat structures may also contain other substances such as ceramics in addition to the basic polymer or polymers.

The basic polymer is preferably polybenzimidazole (PBI) of formula (II)

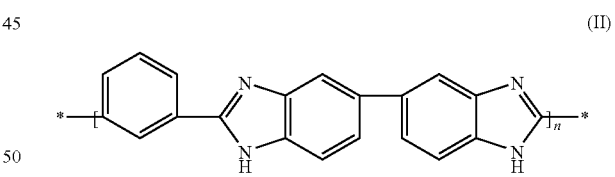

(II)

The solvent for the solution used to produce the polymer membrane may be selected from any solvents in which the basic polymer(s) is/are soluble. The solvent is preferably selected from the group consisting of N-methyl pyrrolidone (NMP), dimethyl formamide (DMF), dimethyl sulfoxide (DMSO), dimethyl acetamide (DMAc) and mixtures thereof. Dimethyl acetamide is especially preferred.

The concentration of polymer(s) in solution is in the range of 10 wt % to 50 wt %, based on the weight of the finished solution used to produce the polymer membrane. The concentration depends on the type of polymer(s) and its/their molecular weight. The solution used to produce the polymer membrane usually has film-forming properties which permit so-called "machine drawing" of the solution with no problems; this can yield a very uniform polymer membrane.

The dopant for the inventive MEA is a strong polybasic non-oxidizable acid. "Non-oxidizable" in the context of this invention means that no oxidation due to the oxidizing agent fed into the cathode (usually oxygen and/or air) takes place under the usual temperature and ionic strength conditions of a fuel cell. In addition, the acid should not be reduced on the anode. The dopant is preferably a polybasic acid, in particular an inorganic acid. Examples include phosphoric(V) acid or sulfuric(VI) acid, but phosphoric(V) is preferred. Use of these free acids as dopants is preferred at the operating temperatures of the fuel cell of more than 100° C.

To increase the mechanical stability of the polymer membrane and to limit the absorption capacity of the polymer membrane for the dopant, it may be advisable to crosslink the polymer membrane by industrial polymer membrane drawing in production.

Crosslinking of the polymer membrane is preferably performed with a crosslinking agent which is added to the polymer membrane casting solution. This may include all compounds having at least two functional groups which can react with the polymer(s) used to form covalent bonds. According to a preferred embodiment of this invention, the crosslinking agent used has epoxy groups and/or isocyanate groups, as described in WO 00/44816 A1. Compounds with at least two epoxy groups in the molecular are preferred. The use of 1,4-butanediol diglycidyl ether (III) as a crosslinking agent is especially preferred.

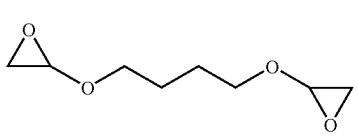
(III)

The amount of crosslinking agent needed for crosslinking the polymer membrane depends on the desired degree of crosslinking and on the molecular weight of the basic polymer used and the reaction temperature; preferably 2 to 20 mol %, based on the repeating unit of the polymer, is added to the reaction solution.

In a preferred embodiment, polymer membranes that have been simultaneously crosslinked and plasticized during the step of polymer membrane production by industrial machine drawing are used.

In this case, plasticizers that include a reaction product of an at least dibasic acid, usually an inorganic acid with an organic compound or the condensation product of the aforementioned reaction product with a polybasic acid are used. These are polybasic acids, at least dibasic acids that are reacted once or more with an organic compound in an ester-like reaction to form esters, acid amides or acid anhydrides, with one acid proton remaining in the resulting compound. The organic compound which is reacted with the acid is selected from the group comprising linear or branched, optionally substituted aliphatic alcohols with 5 to 20 carbon atoms, preferably 6 to 16, more preferably 7 to 12 and most preferably 8 to 10 carbon atoms; optionally substituted aromatic alcohols; linear or branched, optionally substituted aliphatic amines with 5 to 20 carbon atoms, preferably to 6 to 16, more preferably 7 to 12 and most preferably 8 to 10 carbon atoms and aromatic amines. Of the organic compounds, 2-ethylhexanol and phenol are especially preferred for the reaction with the acid, preferably phosphoric acid. The reaction of the at least dibasic acid with the organic compound is to be performed in such a way that an acid group, i.e., a hydroxyl group of the acid remains behind. In the case of a tribasic acid such as phosphoric acid, two acid OH groups may be bridged with a bifunctional organic compound, e.g., a diol, i.e., esterified forming a ring, for example.

According to a preferred embodiment of the inventive process, a reaction product of an at least dibasic acid with an organic compound is used as the plasticizer. Of the suitable compounds, phosphoric acid diesters such as di-(2-ethylhexyl) phosphoric acid ester and diphenyl phosphoric acid ester are preferred, but di-(2-ethylhexyl) phosphoric acid ester is especially preferred.

Crosslinking and plasticizing may be used as the control parameters to influence the distribution of the dopant in the membrane-electrode assembly, e.g., to limit the absorption capacity of the polymer membrane for the dopant but at the same time permit a rapid exchange of dopant between the electrode and the polymer membrane. However, the operating temperature, the polymer membrane thickness, preferably in the range of 20 μm to 70 μm and the concentration of the dopant (preferably phosphoric acid) used for electrode impregnation all have an influence in these parameters.

This invention also relates to a method for producing a membrane-electrode assembly (MEA) of two flat gas diffusion electrodes and a polymer membrane sandwiched between them with at least one basic polymer and a dopant, including the following steps:

A Impregnating the flat gas diffusion electrode with a dopant up to a dopant content of 60 to 120% of the weight of the basic polymer and the polymer membrane, B Sandwiching the polymer membrane between the impregnated gas diffusion electrodes, C Arranging the sandwich from step B between two pressing plates D Hot pressing the arrangement at a temperature between 100° C. and 250° C. and a pressure between 1 bar and 5 bar for a period of 5 seconds to 60 minutes.

Steps A through D are carried out in a continuous or discontinuous process.

The amount of dopant with which the gas diffusion electrode(s) is/are impregnated is preferably selected so that after reaching the mass transport equilibrium for the exchange of dopant between gas diffusion electrode(s) and polymer membrane, a conductivity of at least 0.1 S/m (25° C.) is achieved in the polymer membrane.

The operating temperature is between 50° C. and 250° C., preferably between 100° C. and 250° C., especially preferably between 150° C. and 200° C. and/or most especially preferably between 150° C. and 170° C. However, the operating temperature may also be 50 to 100° C., for example. To start operation of the polymer electrolyte fuel cell, dopant must be transferred from the gas diffusion electrodes into the polymer membrane. This is preferably accomplished during a so-called conditioning phase by hot pressing; in this phase the membrane-electrode assembly is pressed together at an elevated temperature and preferably with nitrogen purging.

According to this invention, the polymer electrolyte fuel cell for a working temperature of up to 250° C. with a membrane-electrode assembly is produced from two flat gas diffusion electrodes with a polymer membrane sandwiched between them and with at least one basic polymer and a dopant having at least the following steps:

A Impregnating the gas diffusion electrodes with a dopant up to a dopant content of 60 to 120% of the weight of the basic polymer, B Sandwiching the polymer membrane between the doped gas diffusion electrodes, C Arranging the sandwich from step B between two pressing bipolar plates of a polymer electrolyte fuel cell,
D Applying a contact pressure to the polymer membrane-electrode layer in the polymer electrolyte fuel cell at a temperature between 50° C. and 250° C. and exposing the fuel cell to reactive gases over a period between at least one minute and ten hours, preferably between one minute and 60 minutes.

In a preferred embodiment of this invention, hydrogen and air are used as reactive gases, so the polymer electrolyte membrane fuel cell is put into operation.

In the first phase of startup operation of the polyelectrolyte fuel cell, there is a redistribution of the dopant between the impregnated case distribution electrodes and the polymer membranes, so the conductivity of the polymer membrane increases to values greater than 0.1 S/m at temperatures of at least 25° C. At the same time, a proton conducting connection of the gas diffusion electrode to the polymer membrane is implemented.

BRIEF DESCRIPTION OF THE DRAWINGS

This invention will now be explained on the basis of the following examples and FIG. 1 through FIG. 2. It is emphasized that these are examples only and by no means restrict the scope of the invention.

DETAILED DESCRIPTION OF THE PREFERRED EMBODIMENTS

Example 1

Producing a Polymer Casting Solution 216 g PBI with an inherent viscosity of 0.86 dL/g is dissolved in 684 g DMAc by agitation for 3 hours in a pressurized reactor at 200° C. The solution is cooled and filtered through a Sartopure® PP2(P9) filter capsule with a pore size of 20 μm from Sartorius AG in Göttingen and degassed. The solution has a solids content of 24%.

Example 2

Producing a Polymer Membrane

By industrial machine drawing on a polyester film which serves as the substrate, a polymer membrane 40 μm thick was produced from the solution according to Example 1 by evaporating the solvent at 150° C. and then the polymer membrane is separated from the substrate. For complete removal of solvent, the polymer membrane is then afterdried at a temperature of 200° C. for four hours.

Example 3

Tensile Stress Measurements

To evaluate the mechanical stability, tensile stress measurements were performed. Test bodies corresponding to Example 2 with a length of 10 cm and a width of 2 cm were clamped in a Z 2.5 measurement apparatus from the company Zwick GmbH & Co. and pulled apart at a rate of 5 cm/min at room temperature. The polymer membrane would tear at a stress at failure of 150 N/mm$^2$ and an elongation of 7%.

Example 4

Determining the Degree of Crosslinking

The degree of crosslinking of the polymer membranes produced according to Example 2 was determined by extraction. A piece of polymer membrane with an edge length measuring 7.5×7.5 cm was punched out and placed in a round-bottomed flask without an agitator. DMAc was added to the round-bottomed flask until the polymer membrane was completely covered with fluid. The round-bottomed flask was then heated in an oil bath to 130° C. During the heating the piece of polymer membrane dissolved completely even before reaching the desired temperature because the polymer membrane was not crosslinked.

Example 5

Producing a Membrane-Electrode Assembly

To produce a membrane-electrode assembly (MEA), a polymer membrane produced according to Example 2 was cut into square pieces approximately 104 cm$^2$ in size. Commercially available ELAT electrodes with 2.0 mg/cm$^2$ Pt coverage and an area of 50 cm$^2$ from the company E-TEK were impregnated with concentrated phosphoric acid at room temperature in vacuo so that the electrodes would contain at least 0.25 g H$_3$PO$_4$/cm$^3$ electrode volume after drying at 100° C. These electrodes were then installed with the inventive polymer membrane in a conventional arrangement in a test fuel cell from the company Fuel Cell Technologies, Inc. The cell was sealed with a contact pressure of 2 MPa and then conditioned at 160° C. for 16 hours while purging with nitrogen and finally cooled.

Example 6

Determining the Power Parameters of the Membrane-Electrode Assembly According to Example 5

Figure 1:
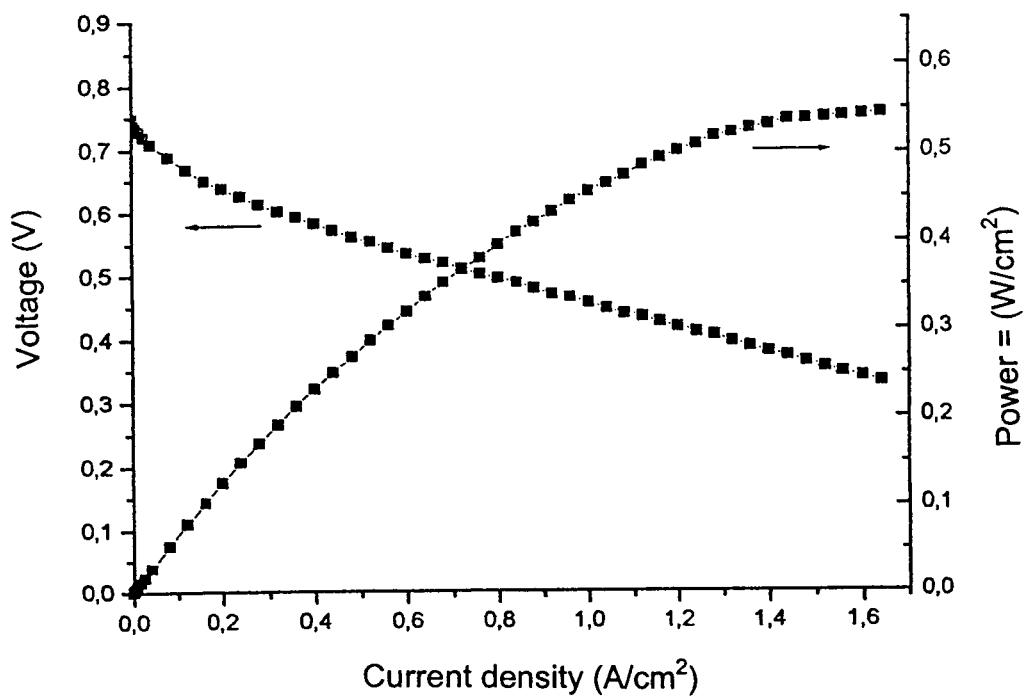
FIG. 1 shows a polarization curve as a function of the voltage and the current density for an MEA produced according to Example 6 and FIG. 2 shows a polarization curve as a function of the voltage and the current density for an MEA produced according to Example 12.

The cell according to Example 5 was connected to a conventional commercial FCATS Advanced Screener fuel cell test stand from the company Hydrogenics Inc. and was put in the operating state: T=160° C., gas pressure for hydrogen and air p=3 bar, stoichiometric ratio for air 2 and for hydrogen 1.5. Under these conditions, the cell had an impedance of approximately 10 mΩ measured with an IM6 impedance spectrometer from the company Zahner-elektrik GmbH & Co. KG. FIG. 1 shows the polarization curve as a function of voltage and amperage. The low open-circuit voltage characterizes the transfer from hydrogen to the cathode side due to a stress crack in the polymer membrane.

Example 7

Preparing a Polymer Casting Solution Containing Crosslinking Agent and Dopant 180 g PBI with an inherent viscosity of 0.86 dL/g was dissolved in 720 g DMAc by stirring for three hours in a pressurized reactor at 200° C. The solution was cooled and filtered through a Sartopure® PP2(P9) filter capsule with a pore size of 20 μm (Sartorius AG, Göittingen). The solution had a solids content of 20%.

This solution was mixed with 4 wt % 1,4-butanediol diglycidyl ether based on the amount of polymer while agitating vigorously. After approximately 10 minutes, 20 wt % di-(2-ethylhexyl) phosphate based on the amount of polymer was added slowly by drops. The solution was heated to 100° C. and stirred further for one hour, then cooled and degassed.

Example 8

Producing a Polymer Membrane

By industrial machine drawing on a polyester film which served as the substrate, a polymer membrane 44 μm thick was produced from the solution according to Example 7 by evaporating the solvent at 150° C. and then was separated from the substrate. To completely remove the solvent, the polymer membrane was then afterdried for four hours at a temperature of 200° C.

Example 9

Tensile Stress Measurements

To evaluate the mechanical stability, tensile stress measurements were performed. Test bodies according to Example 8 with a length of 10 cm and a width of 2 cm were clamped in a Z 2.5 measurement apparatus from the company Zwick GmbH & Co. and pulled apart at a rate of 5 cm/min at room. The polymer membrane would tear at a stress at failure of 130 $N/mm^2$ and an elongation of 9%.

Example 10

Determining the Degree of Crosslinking

The degree of crosslinking was determined by extraction on the polymer membranes produced according to Example 8. A piece of polymer membrane with an edge length of 7.5×7.5 cm was punched out and placed in a round-bottomed flask without an agitator. DMAc was added to the round-bottomed flask in a sufficient amount to completely cover the piece of polymer membrane with fluid. The round-bottomed flask was heated in an oil bath to 130° C. After heating for one hour at 130° C. and cooling to room temperature, the sample was filtered out. The sample was dried overnight in a drying cabinet at 200° C. Then the sample was placed in a desiccator filled with drying beads to cool it to room temperature and the desiccator was evacuated to 100 mbar. By gravimetric measurement, it was determined that 92% of the initial weight had undergone stable crosslinking.

Example 11

Producing a Membrane-Electrode Assembly

To produce a membrane-electrode assembly (MEA), a polymer membrane produced as described in Example 8 was cut into square pieces approximately 104 $cm^2$ in size. Commercially available ELAT electrodes with a Pt coverage of 2.0 $mg/cm^2$ and an area of 50 $cm^2$ from the company E-TEK were impregnated in vacuo with concentrated phosphoric acid at room temperature so that the electrodes after drying at 100° C. contained at least 0.25 g $H_3PO_4/cm^3$ electrode volume and were then installed in a test fuel cell from the company Fuel Cell Technologies, Inc. with the polymer membrane according to this invention in a conventional arrangement. The cell was sealed with a contact pressure of 2 MPa and then conditioned at 160° C. for 16 hours while purging with nitrogen and then cooled.

Example 12

Determining the Power Parameters of the Membrane-Electrode Assembly According to Example 11

Figure 2:
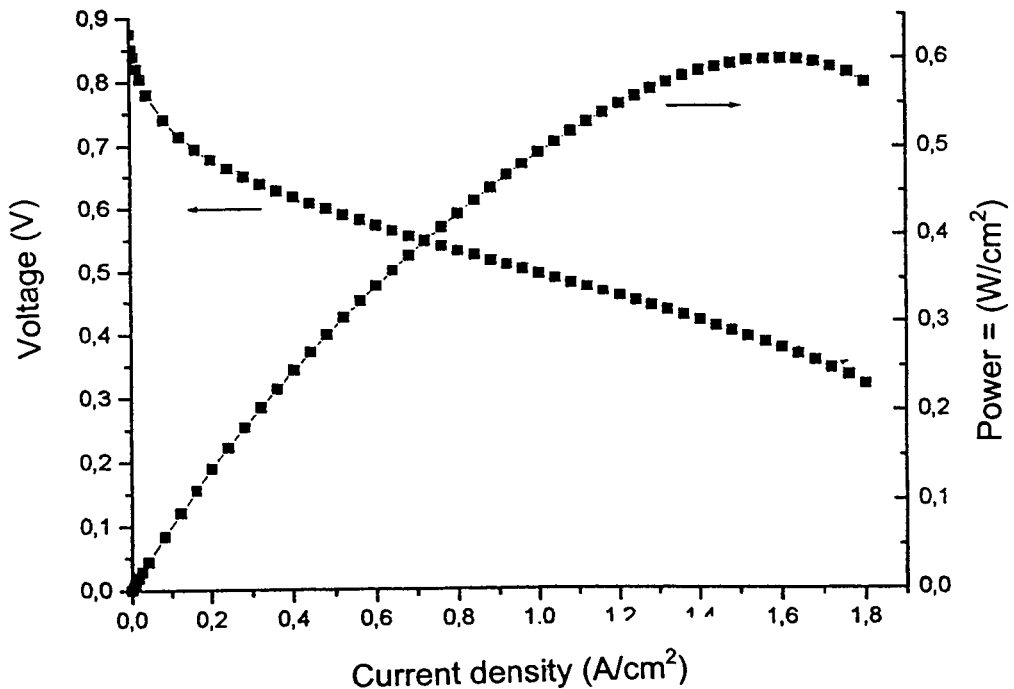

The cell according to Example 11 was connected to a conventional commercial FCATS Advanced Screener fuel cell test stand from the company Hydrogenics Inc. and then set in operation: T=160° C., gas pressure for hydrogen and air p=3 bar, stoichiometric ratio for air 2 and for hydrogen 1.5. Under these conditions, the cell had an impedance of approximately 10 mΩ measured with an IM6 impedance spectrometer from the company Zahner-elektrik GmbH & Co. KG. FIG. 2 shows the polarization curve as a function of voltage and amperage. No hydrogen could be detected on the cathode side by measuring the hydrogen with a suitable sensor from the company Dräger.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A membrane-electrode assembly comprising
two flat gas diffusion electrodes each loaded with a dopant, and
a polymer membrane comprising at least one basic polymer, the polymer membrane sandwiched between said electrodes,
wherein the gas diffusion electrodes are loaded with a content of dopant of 60 to 120% of the weight of the basic polymer in the polymer membrane, and wherein after reaching a mass transport equilibrium for the exchange of the dopant between the gas diffusion electrodes and the polymer membrane, the polymer membrane has a conductivity of at least 0.1 S/m at a temperature of no less than 25° C.

2. The membrane-electrode assembly as claimed in claim 1, wherein at least one basic polymer is selected from the group consisting of polybenzimidazoles, polypyridines, polypyrimidines, polyimidazoles, polybenzthiazoles, polybenzoxazoles, polyoxadizoles, polyquinoxalines, polythiadiazoles, poly(tetraazapyrenes) and a copolymer.

3. The membrane-electrode assembly as claimed in claim 2, wherein at least one basic polymer is polybenzimidazole.

4. The membrane-electrode assembly as claimed in claim 1, wherein the polymer membrane is a dry undoped polymer membrane produced by industrial machine drawing.

5. The membrane-electrode assembly as claimed in claim 4, wherein the polymer membrane is crosslinked by reaction with polyfunctional crosslinking agents.

6. The membrane-electrode assembly as claimed in claim 5, wherein the crosslinking agent comprises one or more of epoxy groups and isocyanate groups.

7. The membrane-electrode assembly as claimed in claim 1, wherein the polymer membrane is a plasticized polymer membrane comprising no more than 40 wt % plasticizer.

8. The membrane-electrode assembly as claimed in claim 7, wherein the plasticizer is a reaction product of at least a dibasic acid and an organic compound.

9. The membrane-electrode assembly as claimed in claim 7, wherein the organic compound is phosphoric acid diester.

10. The membrane-electrode assembly as claimed in claim 8, wherein the organic compound is phosphoric acid diester.

11. The membrane-electrode assembly as claimed in claim 8, wherein the phosphoric acid diester is one or more of di-(2-ethylhexyl)phosphoric acid ester and diphenyl phosphoric acid ester.

12. The membrane-electrode assembly as claimed in claim 1, wherein the dopant content in the gas diffusion electrodes is 60% to 120% of the weight of the basic polymer in the polymer membrane.

13. The membrane-electrode assembly as claimed in claim 12, wherein the dopant is a polybasic inorganic acid.

14. The membrane-electrode assembly as claimed in claim 13, wherein the acid is phosphoric acid.

15. The membrane-electrode assembly as claimed in claim 1, wherein at least one basic polymer of the polymer membrane comprises a stress at failure of more than 110 N/mm$^2$ at room temperature and an elongation of more than 6%.

16. The membrane-electrode assembly as claimed in claim 15, wherein the polymer membrane is crosslinked with a bifunctional crosslinking agent.

17. The membrane-electrode assembly as claimed in claim 16, wherein the polymer membrane is plasticized with a plasticizer, wherein the plasticizer is a reaction product of at least a dibasic acid and an organic compound.

18. The membrane-electrode assembly as claimed in claim 17, wherein the polymer membrane consists of polybenzimidazole and 1,4-butanediol diglycidyl ether and wherein the plasticizer is di-(2-ethylhexyl)phosphate.

19. A polymer electrolyte fuel cell comprising a membrane-electrode assembly arranged between bipolar plates, the membrane electrode assembly comprising:

two flat gas diffusion electrodes each loaded with a dopant, and a polymer membrane comprising at least one basic polymer, the polymer membrane sandwiched between said electrodes, wherein the gas diffusion electrodes are loaded with a content of dopant of 60 to 120% of the weight of the basic polymer in the polymer membrane, and wherein after reaching a mass transport equilibrium for the exchange of the dopant between the gas diffusion electrodes and the polymer membrane, the polymer membrane has a conductivity of at least 0.1 S/m at a temperature of no less than 25° C.

* * * * *